Nov. 21, 1950     S. J. WALLACE     2,530,412
CONVEYER WITH TOGGLE LOCKING FEED DOG
Filed Dec. 9, 1947     2 Sheets-Sheet 1
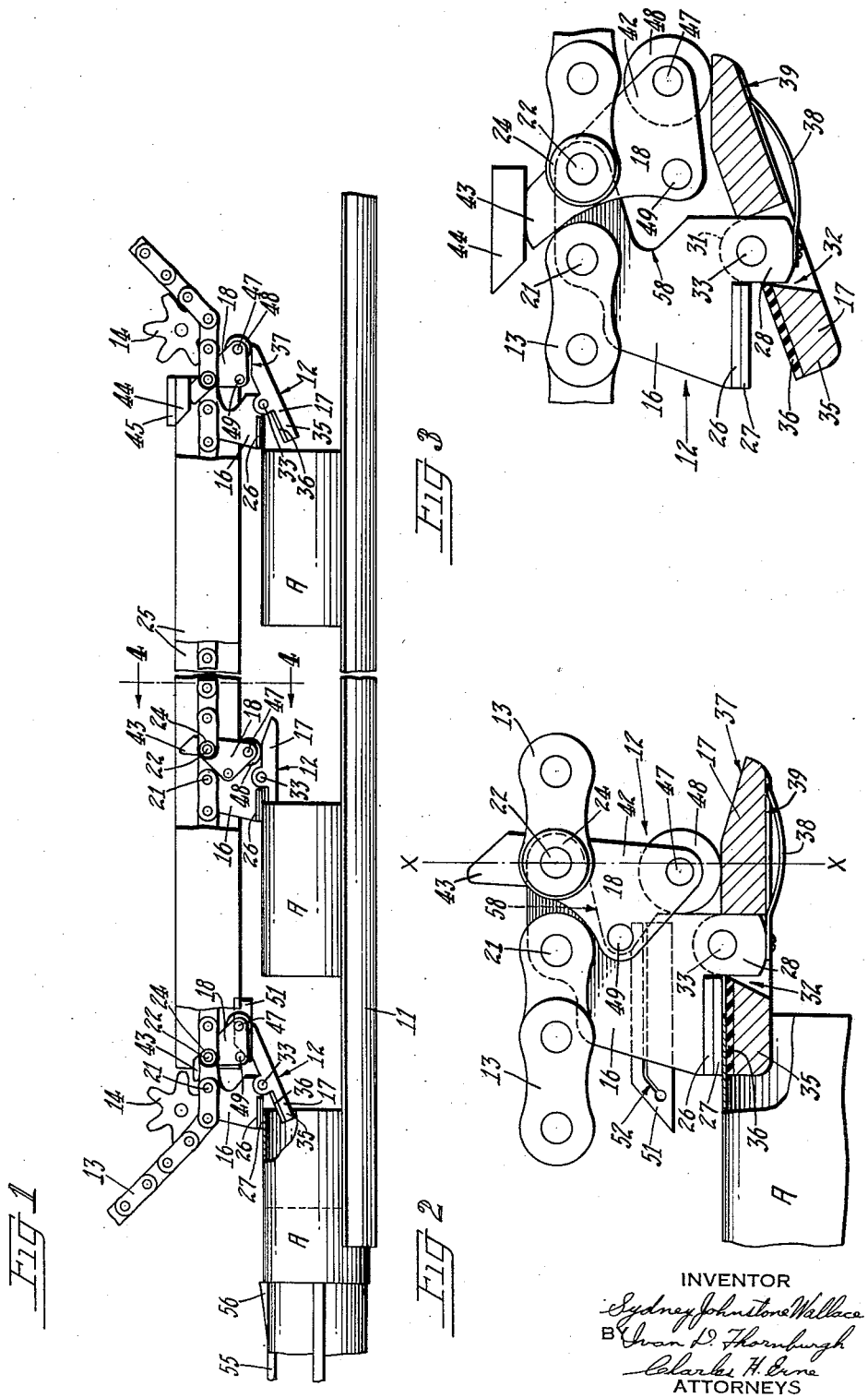
INVENTOR
Sydney Johnstone Wallace
BY Ivan D. Thornburgh
Charles H. Erne
ATTORNEYS Nov. 21, 1950      S. J. WALLACE      2,530,412
CONVEYER WITH TOGGLE LOCKING FEED DOG
Filed Dec. 9, 1947      2 Sheets-Sheet 2
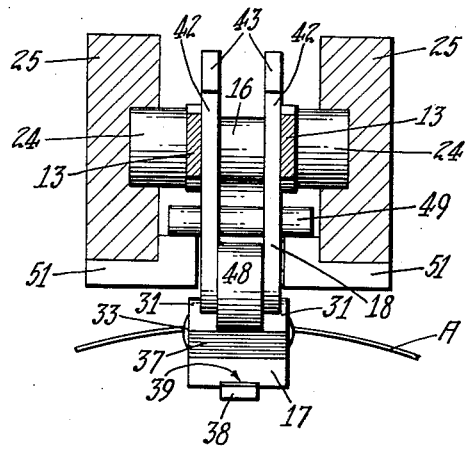
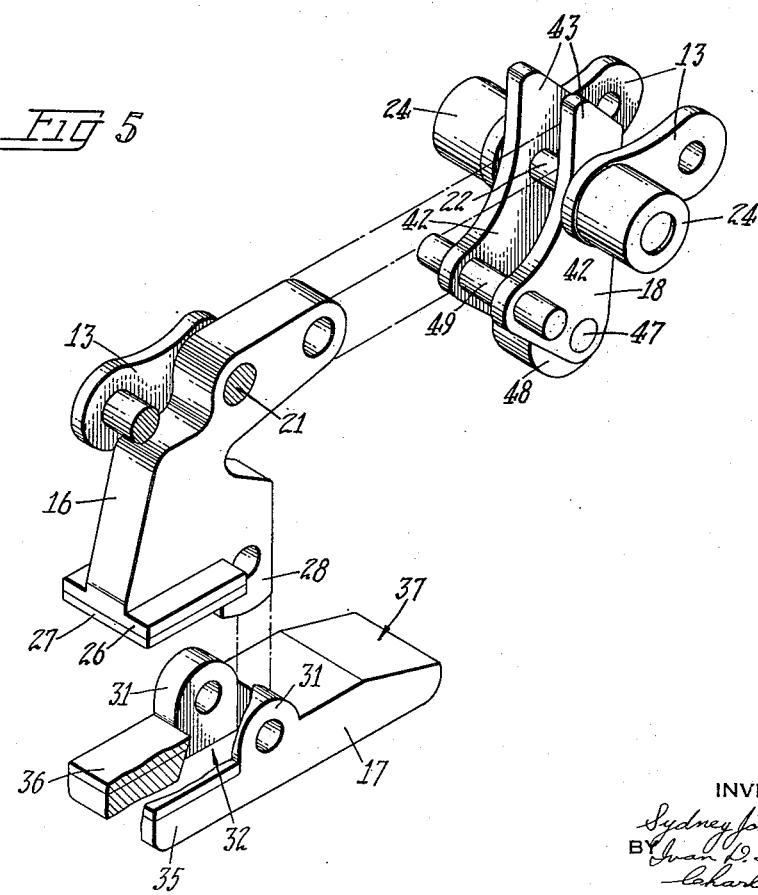
INVENTOR
Sydney Johnstone Wallace
BY Ivan P. Thornburgh
Charles H. Erne
ATTORNEYS Patented Nov. 21, 1950

2,530,412

UNITED STATES PATENT OFFICE 2,530,412

CONVEYER WITH TOGGLE LOCKING FEED DOG

Sydney Johnstone Wallace, Vancouver, British Columbia, Canada, assignor to American Can Company, New York, N. Y., a corporation of New Jersey Application December 9, 1947, Serial No. 790,467

6 Claims. (Cl. 198—179)

The present invention relates to conveyors for moving or feeding containers, container parts, blanks and the like through machines for making, treating or otherwise operating upon such articles and has particular reference to an improved gripper dog for pulling a body along a predetermined path of travel.

An object of the invention is the provision in a conveyor of a gripper dog having a locking feature wherein the jaws of the dog upon closing against a can body or similar article become locked against opening so that a gripped article may be carried along a predetermined path of travel under full control of its gripper dog without fear of displacement.

Another object is the provision of such a gripper dog wherein a gripped can body or other article is pulled along its path of travel instead of being pushed so that control of the body during its travel may be effected through its leading end rather than its following end.

Another object is the provision of such a gripper dog wherein opening and closing of the dog may be effected by the action of short cams located at the beginning and ending of the path of travel of the bodies so that the use of long cams extending the full length of travel of the bodies for holding the dogs closed, may be eliminated.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a portion of a machine having a conveyor, carrying gripper dogs embodying the instant invention, the view showing can bodies in place, with parts broken away;

Figs. 2 and 3 are enlarged side views of a gripper dog shown in Fig. 1, Fig. 2 showing the dog closed and locked against a wall of a can body, and Fig. 3 showing the same dog when open, portions of the dog and the can body (the latter in Fig. 2) being broken away and shown in section;

Fig. 4 is an enlarged transverse section taken substantially along the line 4—4 in Fig. 1, and Fig. 5 is an exploded perspective view of the dog, showing its cooperating parts.

As a preferred embodiment of the instant invention the drawings illustrate a portion of a can body treating machine in which tubular sheet metal can bodies A (Fig. 1) are propelled along longitudinal guide rails 11 while in a horizontal position, by gripper fingers of dogs 12 which are spaced along an endless roller chain conveyor 13 which operates over a pair of spaced sprockets 14.

There are a plurality of the guide rails 11 constituting an outside support or horn arranged so that the can bodies may pass freely along the inside of the horn, thus confining them against lateral displacement. The horn guides the can bodies along a predetermined path of travel for a desired treatment, such as for example, the soldering of their side seams, wiping excess solder therefrom, cooling, preheating, coating, spraying, and many other operations.

The gripper dogs 12 preferably are made in three parts, a link or carrier part or member 16 (Figs. 2, 3, 4 and 5), a clamping finger or member 17, and a locking member or element 18. The upper portion of the link member 16 (as viewed in the drawings) is formed similar to a block chain link and constitutes a part of the conveyor chain, the member being secured in place by pivot pins 21, 22 which connect it to adjacent links in the chain. The pivot pin 22 extends beyond the chain links on both sides thereof and carries rollers 24 which ride in a pair of spaced and parallel tracks 25 disposed above the horn rails 11 for supporting the conveyor chain 13.

The major portion of the link member 16 depends from the conveyor 13 and is formed with a substantially horizontal fixed jaw 26 which projects rearwardly of the link portion and which is faced with a resilient pad 27 made of rubber or the like material. Adjacent the forward end of the jaw 26, the link member is formed with a depending lug 28.

The clamping finger 17 preferably is straight as shown in Fig. 5 and of a width substantially that of the fixed jaw 26. Intermediate its ends the finger is formed with a pair of spaced upright pivot lugs 31 which extend up adjacent the lug 28 on the link member 16. A clearance opening 32 in the finger, between the lugs 31 is provided for the lug 28. A pivot pin 33 extends through the pivot lugs 31 and the link member lug 28 and thus provides a pivot for the finger.

One end of the clamping finger 17 constitutes a movable jaw 35 for cooperation with the fixed jaw 26 of the link member 16, and like the fixed jaw is faced with a resilient work contacting pad 36 of rubber or the like material. The opposite end of the finger is formed with a tapered flat locking cam 37 which is disposed on the upper face of the finger. This end of the finger is held under pressure of a flat spring 38 which extends longitudinally of the finger.

One end of the spring 38 is secured to the bottom of the lug 28 of the link member 16, while its opposite end is free and engages against the finger in a longitudinal shallow groove 39 formed in the bottom surface of the finger. The spring urges the cam end of the finger upwardly as shown in Fig. 3 and thus normally holds the movable jaw 35 in an open position relative to the fixed jaw 26 of the link member 16.

The locking element 18 is formed as a pair of spaced and parallel upright side members 42 which are located one on each side of the link member 16 between the conveyor chain 13 and the clamping finger 17. These members are mounted on the pivot pin 22 as best shown in Fig. 5. The upper ends of the members extend above the pivot pin 22 and are formed with tapered release lugs 43 for periodic engagement with a stationary auxiliary or release cam 44 (Figs. 1 and 3) disposed in their path of travel adjacent the discharge end of the machine and secured to a bridge bar 45 fastened to the tracks 25.

The lower ends of the locking members 42 are tied together by a pivot pin 47 which carries a roller 48 disposed between the members for engagement with the cam 37 on the clamping finger 17. The spring 38 holds the cam against the roller. Between the pivot pin 22 of the conveyor and the pivot pin 47 of the roller and disposed inwardly of a line drawn between these two pivot pins, the spaced parallel locking member portions 42 carry a locking pin 49. The ends of this locking pin extend beyond the locking member portion 42 as best shown in Figs. 4 and 5 for periodic engagement with a pair of oppositely disposed stationary locking cams 51 (Figs. 1, 2 and 4) secured to the bottoms of the tracks 25 adjacent their entrance ends. These cams are located one on each side of the path of travel of the dogs between the tracks. The cams are formed with a narrow slit 52 disposed adjacent their cam surfaces to impart a springy or resilient action to the cams during their operation as will be more fully explained hereinafter.

In operation, a dog 12 attached to the conveyor 13, moves down around the entrance sprocket 14 (at the left as viewed in Fig. 1) and into the path of travel and just in advance of an incoming can body A moving along the horn or support rails 11. The jaws 26, 35 of the dog are open at this time as shown in Figs. 1 and 3. The incoming can body is advanced so that a wall portion preferably at the top of the body, adjacent its leading end, is interposed between the open jaws and thus moves with the dog for a short space of travel. This movement of the body is effected in any suitable manner, such as through a reciprocating feed bar 55 having a spring pressed feed dog 56 and constituting a portion of a machine for feeding the bodies to the horn rails 11.

As soon as the leading end of the can body A is in position between the open jaws 26, 35 of the dog 12, the locking pin 49 in the locking element 18 rides up onto the stationary locking cams 51 as shown in Fig. 1 and this action tilts or swings the locking element 18 on its pivot pin 22 in a downward direction. This movement of the locking element presses its roller 48 against the locking cam 37 on the movable finger 17 and thus pivots the finger on its pivot pin 33, closing the movable jaw 35 against the inside surface of the can body wall and thus clamping the can body against the fixed jaw 26 of the link member 16. The body wall is thus held firmly between the resilient pads 27, 36 on the two jaws 26, 35.

The jaw closing movement of the locking element 18 is continued by the stationary locking cams 51 until the roller 48 engages against and is stopped from further movement by the edge of the link member 16 as best shown in Fig. 2. The link member is formed with a clearance recess 58 for the locking pin 49 to permit this movement while the resiliency of the stationary locking cams 51 due to their spring action, takes up any pressure on the locking pin.

In this position of the roller 48, the center of its pivot pin 47 is just inwardly of a line $x$—$x$ (Fig. 2) drawn from the center of the chain pivot pin 22 to a point normal or perpendicular to the inner face of the clamping finger 17 and thus forms a toggle lock which retains the locking element 18 in locked position without any other assistance. Hence only a short cam 51 is needed to lock the jaws 26, 35 against the can body, the jaws remaining locked by the toggle action of the locking element 18, for as long a period of travel of the can body as desired.

The movement of the dog 12 with the conveyor 13 thus pulls the firmly gripped can body along the horn rails 11 through any desired treating or operating stations for the body treating operation. When it is desired to release the can body for discharge from the machine, the release lugs 43 engage the stationary release cam 44 as shown in Fig. 3 and this swings the locking element 18 upwardly and outwardly. The roller 48 of the locking element thus is forced across the line $x$—$x$ in Fig. 2 and hence its toggle locking action is released. This permits the roller to ride along the upper inclined surface of the locking cam 37 and thus allows the spring 38 to open the movable jaw 35 as in Fig. 3 to release the can body. The jaw thus remains in this open position, under pressure of the spring 38 until it travels back with the conveyor along its upper run to re-engage the stationary locking cams 51 for closing the jaws on another incoming can body A. The released body may be discharged to any suitable place of deposit in any suitable manner.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A movable chain conveyor having a plurality of gripper devices thereon in spaced order for gripping can bodies and other articles and for pulling them along a path of travel in a continuous procession, each of said gripper devices comprising a carrier member constituting a link of said conveyor, a fixed jaw on said carrier member, a movable clamping member pivotally mounted on said carrier member, a jaw on said movable member for cooperation with said fixed jaw on said carrier member, a locking element pivotally carried on one of said members and engageable with the other of said members and operable for locking itself and the jaws of said members in closed position for tightly gripping and pulling a can body along said path of travel, and cam means disposed adjacent said path of travel for pivoting the locking elements of each of said gripper devices into locking position for gripping and holding said can bodies, and auxiliary cam means also disposed adjacent said path of travel for pivoting the locking elements of each of said gripper devices into an unlocked position for releasing said can bodies.

2. A gripper device for can bodies and other articles, comprising a carrier member having a fixed jaw formed thereon for advancing the articles along a path of travel, a clamping member pivotally mounted on said carrier member and having a movable jaw on one end thereof engageable with said fixed jaw, a locking member pivotally mounted on said carrier member and extending between the latter and said clamping member, said locking member being engageable with the opposite end of said clamping member and independently movable for locking itself against said opposite end for closing said movable jaw on said one end of the clamping member against said fixed jaw on the carrier member for maintaining said jaws in closed position for tightly gripping and carrying the article therebetween, means on said locking member for swinging it on its pivotal mounting into locked and unlocked position relative to said clamping member, cam means disposed adjacent said path of travel for pivoting said locking member into locking position for gripping and holding said article, and auxiliary cam means also disposed adjacent said path of travel for pivoting said locking member into an unlocked position for releasing said article from said carrier member.

3. A gripper device for can bodies and other articles, comprising a carrier member having a fixed jaw formed thereon for advancing the articles along a path of travel, a clamping member pivotally mounted intermediate its ends on said carrier member and having a movable jaw on one end thereof engageable with said fixed jaw, a cam element on the opposite end of said clamping member, a locking member pivotally mounted on said carrier member and interposed between the latter and said clamping member, said locking member carrying a cam roller engageable with said cam element, said locking member being pivotally movable into locking engagement against said cam element on said clamping member for closing its said movable jaw against said fixed jaw on said carrier member and for maintaining the jaws in closed position for tightly gripping and carrying the article therebetween, cam means disposed adjacent said path of travel for pivoting said locking member into locking position for gripping and holding said article, and auxiliary cam means also disposed adjacent said path of travel for pivoting said locking member into an unlocked position for releasing said article from said carrier member.

4. A gripper device for can bodies and other articles, comprising a carrier member having a fixed jaw formed thereon for advancing the articles along a path of travel, a clamping member pivotally mounted intermediate its ends on said carrier member and having a movable jaw on one end thereof engageable with said fixed jaw, a cam portion formed on the opposite end of said clamping member, a locking member pivotally mounted on said carrier member and interposed between the latter and said clamping member, said locking member carrying a cam roller engageable with the cam portion of said clamping member, spring means on said carrier member engaging said cam portion for maintaining the latter in engagement with said roller, said locking member being pivotally movable into locking engagement against the cam portion of said clamping member for closing said movable jaw against said fixed jaw on the carrier member for maintaining the jaws in closed position for tightly gripping and carrying the article therebetween, cam means disposed adjacent said path of travel for pivoting said locking member into locking position for gripping and holding said article, and auxiliary cam means also disposed adjacent said path of travel for pivoting said locking member into an unlocked position for releasing said article from said carrier member.

5. A conveyor having means thereon for gripping can bodies and other articles for propelling the article along a path of travel, a carrier member mounted on said conveyor in fixed relation thereto, an integral rigid jaw on said carrier member, a clamping member pivotally mounted intermediate its ends on said carrier member, a movable jaw on one end of said clamping member for cooperation with said fixed jaw on said carrier member, a locking element pivotally carried on said carrier member and extending between the latter and said clamping member, said locking element being engageable with the opposite end of said clamping member and movable on its pivot for locking itself against the clamping member to engage the jaws of said members in closed position for tightly gripping and advancing the article along said path of travel, cam means disposed adjacent said path of travel for pivotally moving said locking element in one direction into locking position to effect gripping and holding of said article between said jaws, and a second cam means disposed adjacent said path of travel for pivotally moving said locking element in the opposite direction into an unlocked position relative to said clamping member for releasing said article from between said jaws.

6. A movable link chain conveyor having a plurality of spaced means thereon for gripping can bodies and other articles and for pulling them in spaced relation along a path of travel in a continuous procession, each of said gripping means comprising a carrier member constituting a link of said conveyor, a fixed jaw on said carrier member, a clamping member pivotally mounted intermediate its ends on said carrier member, a movable jaw on one end of said clamping member for cooperation with said fixed jaw on said carrier member, resilient pads on said jaws for yieldably gripping the article, a locking element pivotally carried on said conveyor adjacent said carrier member and disposed between the latter and said clamping member, said locking element being engageable with the opposite end of said clamping member and movable on its pivot for locking itself against said clamping member with a toggle action to engage the jaws of said members in closed position for tightly gripping and pulling the article along said path of travel, a fixed cam member disposed adjacent said path of travel for engaging and pivotally moving said locking element in one direction into locking position for gripping and holding the article with a toggle action between said jaws, a second fixed cam member disposed adjacent said path of travel for engaging and pivotally moving said locking element in the opposite direction into an unlocked position for releasing said article from between said jaws, and spring means on said carrier member engaging said clamping member for yieldably holding the clamping member in engagement with said locking element.

SYDNEY JOHNSTONE WALLACE.

REFERENCES CITED

The following references are of record in the file of this patent:

UNITED STATES PATENTS

| Number | Name | Date |
|---|---|---|
| 1,054,360 | Miller | Feb. 25, 1913 |
| 1,058,373 | Kruse | Apr. 8, 1913 |
| 1,508,708 | McBride | Sept. 16, 1924 |
| 1,765,469 | Vollink | June 24, 1930 |
| 2,319,280 | Widell | May 18, 1943 |
| 2,419,559 | Isgren et al. | Apr. 29, 1947 |